US008908600B2

(12) United States Patent
Sampath et al.

(10) Patent No.: US 8,908,600 B2
(45) Date of Patent: Dec. 9, 2014

(54) CHANNEL STATE INFORMATION FEEDBACK FRAME FORMAT AND FEEDBACK RULES FOR VERY HIGH THROUGHPUT WIRELESS SYSTEMS

(75) Inventors: Hemanth Sampath, San Diego, CA (US); Didier Johannes Richard Van Nee, De Meern (NL); Sameer Vermani, San Diego, CA (US); Albert Van Zelst, Woerden (NL); Vincent Knowles Jones, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 161 days.

(21) Appl. No.: 13/280,776

(22) Filed: Oct. 25, 2011

(65) Prior Publication Data

US 2012/0275376 A1    Nov. 1, 2012

Related U.S. Application Data

(60) Provisional application No. 61/406,977, filed on Oct. 26, 2010, provisional application No. 61/407,817, filed on Oct. 28, 2010, provisional application No. 61/407,886, filed on Oct. 28, 2010.

(51) Int. Cl.
*H04L 12/28*     (2006.01)
*H04J 1/16*      (2006.01)
*G06F 11/00*     (2006.01)
*G01R 31/08*     (2006.01)

(52) U.S. Cl.
USPC ........... 370/328; 370/236; 370/278; 370/467; 375/260

(58) Field of Classification Search
USPC ................ 370/252–328, 278–331, 431–468; 455/452–500; 375/267–299
See application file for complete search history.

(56) References Cited

U.S. PATENT DOCUMENTS 7,486,655 B2 *   2/2009   Ting et al. ............ 370/343
7,839,944 B2 *  11/2010   Lee et al. ............. 375/267

(Continued)

FOREIGN PATENT DOCUMENTS

EP     1672824 A2    6/2006
EP     1816772 A1    8/2007

(Continued)

OTHER PUBLICATIONS

"IEEE Standard for Information technology—Telecommunications and information exchange between systems—Local and metropolitan area networks—Specific requirements Part 11: Wireless LAN Medium Access Control (MAC) and Physical Layer (PHY) Specifications Amendment 5: Enhancements for Higher Throughput", IEEE Standard, IEEE, Piscataway, NJ, USA, Oct. 29, 2009, pp. 1-536, XP017604244, ISBN: 978-0-7381-6046-7.

(Continued)

*Primary Examiner* — Man Phan
(74) *Attorney, Agent, or Firm* — Dang M. Vo

(57) ABSTRACT

Certain aspects of the present disclosure provide techniques and apparatus for generating a unified format of channel state information (CSI) feedback for Very High Throughput (VHT) wireless systems. One example method generally includes generating, at a first apparatus, a frame comprising information relating to SNR if a second apparatus is communicating with the first apparatus using single-user MIMO (SU-MIMO) or multi-user MIMO (MU-MIMO) and transmitting a signal based on the generated frame to the second apparatus. Another example method generally includes generating, at an apparatus, a structure comprising CSI, wherein the CSI includes one of a first matrix with estimates of a channel associated with the apparatus or a second matrix obtained based on singular value decomposition (SVD) of the first matrix and wherein the structure further comprises an indication of which of the first and second matrices is included in the CSI; and transmitting the structure over the channel.

33 Claims, 10 Drawing Sheets

(56) References Cited

U.S. PATENT DOCUMENTS

| | | | |
|---|---|---|---|
| 8,050,286 B2 * | 11/2011 | Jin et al. | 370/431 |
| 8,059,733 B2 * | 11/2011 | Khojastepour et al. | 375/260 |
| 8,238,277 B2 * | 8/2012 | Orlik et al. | 370/310 |
| 8,284,849 B2 * | 10/2012 | Lee et al. | 375/260 |
| 8,331,464 B2 * | 12/2012 | Lee et al. | 375/260 |
| 8,396,163 B2 * | 3/2013 | Collings et al. | 375/299 |
| 2006/0250963 A1 | 11/2006 | Jin et al. | |
| 2006/0291544 A1 | 12/2006 | Fischer et al. | |
| 2007/0049218 A1 | 3/2007 | Gorokhov et al. | |
| 2007/0104288 A1 | 5/2007 | Kim | |
| 2007/0115799 A1 | 5/2007 | Ting et al. | |
| 2007/0223423 A1 * | 9/2007 | Kim et al. | 370/334 |
| 2007/0253501 A1 | 11/2007 | Yamaura | |
| 2007/0258366 A1 * | 11/2007 | Imamura | 370/230 |
| 2008/0080635 A1 | 4/2008 | Hugl et al. | |
| 2010/0099412 A1 | 4/2010 | Ramachandran et al. | |
| 2010/0111028 A1 | 5/2010 | Kim et al. | |
| 2010/0322351 A1 | 12/2010 | Tang et al. | |
| 2011/0002219 A1 | 1/2011 | Kim et al. | |
| 2011/0051636 A1 | 3/2011 | Van Nee et al. | |
| 2011/0069688 A1 | 3/2011 | Zhang et al. | |
| 2011/0096738 A1 | 4/2011 | Choi | |
| 2011/0110263 A1 | 5/2011 | Yi et al. | |
| 2011/0116488 A1 | 5/2011 | Grandhi | |
| 2011/0159866 A1 | 6/2011 | Kim et al. | |
| 2011/0199968 A1 * | 8/2011 | Kim et al. | 370/328 |
| 2012/0250670 A1 | 10/2012 | Cordeiro | |
| 2012/0281620 A1 | 11/2012 | Sampath et al. | |
| 2013/0028344 A1 * | 1/2013 | Chen et al. | 375/267 |

FOREIGN PATENT DOCUMENTS

| | | |
|---|---|---|
| JP | 2013501386 A | 1/2013 |
| JP | 2013545339 A | 12/2013 |
| WO | 2008050996 A2 | 5/2008 |
| WO | 2009027931 A2 | 3/2009 |
| WO | WO-2010018433 A1 | 2/2010 |
| WO | WO-2012047855 A2 | 4/2012 |

OTHER PUBLICATIONS

IEEE Standard for Local and metropolitan area networks Part 16: Air Interface for Broadband Wireless Access Systems;IEEE Std 802.16-2009 (Revision of IEEE Std 802.16-2004), IEEE Standard, IEEE, Piscataway, NJ, USA, May 29, 2009, pp. C1-C2004, XP017604205, ISBN: 978-0-7381-5919-5 p. 358-360.

International Search Report and Written Opinion—PCT/US2011/057912—ISA/PO—Mar. 15, 2012.

Mohsen Eslami, et al., "Efficient Transmission Technique for MIMO-OFDM Broadcast Channels with Limited Feedback", Spread Spectrum Techniques and Applications, 2008. ISSSTA '08. IEEE 10th International Symposium ON, IEEE, Piscataway, NJ, USA, Aug. 25, 2008, pp. 237-241, XP031319014, ISBN: 978-1-4244-2203-6.

Syafei W., et al., "A Gigabit MIMO WLAN system with international standardization strategy," Ntelligent Signal Processing and Communication Systems, 2009, 228-231.

Zhang H., et al., "11ac Explicit Sounding and Feedback, 802.11-10/1105r0, IEEE 802.11 TGac, Sep. 14, 2010, XP55018327, Retrieved from the Internet: URL: https://mentor.ieee.org/802.11/documents"is dcn=1105&is group=00ac [retrieved on Feb. 2, 2012].

* cited by examiner

| Order | Information |
|---|---|
| 1 | Category (=VHT) |
| 2 | Action (=Compressed Beamforming) |
| 3 | VHT MIMO Control |
| 4 | Compressed Beamforming Report |
| 5 | MU-exclusive Beamforming Report (TBD) — Includes per-tone per-SS SINR; Other fields TBD |

FIG. 4

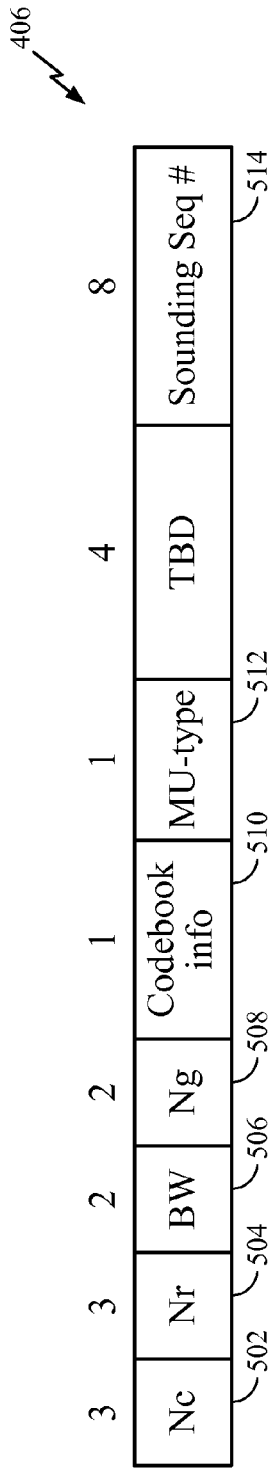
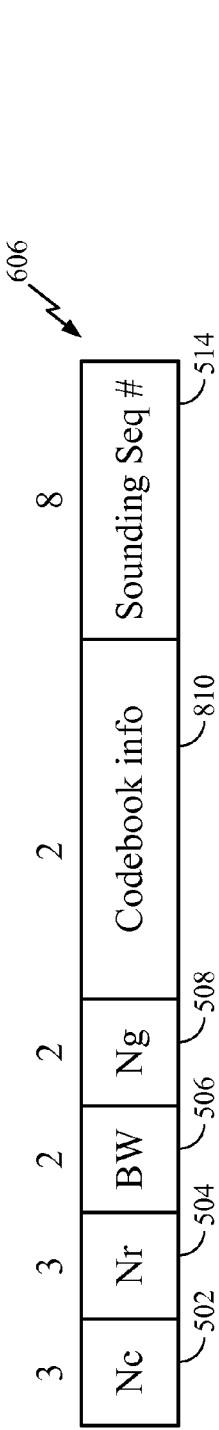
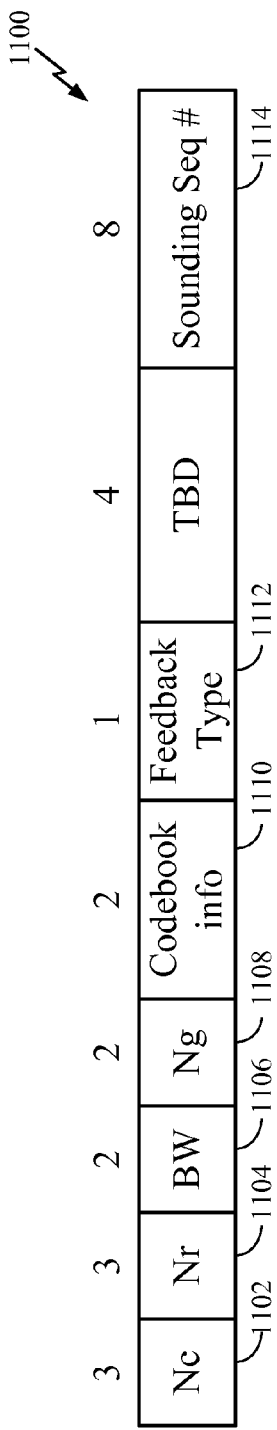
FIG. 5
FIG. 8
FIG. 11

| Order | Information |
|---|---|
| 602 — 1 | Category (=VHT) |
| 604 — 2 | Action (=Compressed Beamforming) |
| 606 — 3 | VHT MIMO Control |
| 608 — 4 | Compressed Beamforming Report |

| Codebook Info | (bψ,bφ) | DeltaSNR_Nb | Delta SNR values | Ng' |
|---|---|---|---|---|
| 0 | (2,4) | 2 bits | TBD | 4*Ng |
| 1 | (2,6) | 2 bits | TBD | 4*Ng |
| 2 | (5,7) | 4 bits | TBD | 2*Ng |
| 3 | (7,9) | 4 bits | TBD | 2*Ng |

FIG. 9A

| Codebook Info | (bψ,bφ) | DeltaSNR_Nb | Delta SNR values | Ng' |
|---|---|---|---|---|
| 0 | (2,4) | 4 bits | TBD | 8*Ng |
| 1 | (4,6) | 4 bits | TBD | 8*Ng |
| 2 | (6,8) | 4 bits | TBD | 2*Ng |
| 3 | (7,9) | 4 bits | TBD | 2*Ng |

FIG. 9B

Feedback Type = 0:V

| Codebook Info | (bψ,bφ) |
|---|---|
| 0 | (2,4) |
| 1 | (4,6) |
| 2 | (5,7) |
| 3 | (7,9) |

FIG. 12A

Feedback Type = 1:H

| Codebook Info | (h_i=h_q) |
|---|---|
| 0 | (4) |
| 1 | (6) |
| 2 | (8) |
| 3 | RSVD |

FIG. 12B

CHANNEL STATE INFORMATION FEEDBACK FRAME FORMAT AND FEEDBACK RULES FOR VERY HIGH THROUGHPUT WIRELESS SYSTEMS

CROSS-REFERENCE TO RELATED APPLICATIONS

This application claims benefit of U.S. Provisional Patent Application Ser. No. 61/406,977, filed Oct. 26, 2010, U.S. Provisional Patent Application Ser. No. 61/407,817, filed Oct. 28, 2010, and U.S. Provisional Patent Application Ser. No. 61/407,886, filed Oct. 28, 2010, all of which are herein incorporated by reference.

BACKGROUND

1. Field

Certain aspects of the present disclosure generally relate to wireless communications and, more particularly, to generating a unified format of channel state information (CSI) feedback for Very High Throughput (VHT) wireless systems.

2. Background

In order to address the issue of increasing bandwidth requirements demanded for wireless communications systems, different schemes are being developed to allow multiple user terminals to communicate with a single access point by sharing the channel resources while achieving high data throughputs. Multiple Input Multiple Output (MIMO) technology represents one such approach that has recently emerged as a popular technique for next generation communication systems. MIMO technology has been adopted in several emerging wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In wireless networks with a single Access Point (AP) and multiple user stations (STAs), concurrent transmissions may occur on multiple channels toward different stations, both in the uplink and downlink direction. Many challenges are present in such systems.

SUMMARY

Certain aspects of the present disclosure provide a first apparatus for wireless communications. The first apparatus generally includes a processing system configured to generate a frame comprising information relating to a signal-to-noise ratio (SNR) if a second apparatus is communicating with the first apparatus using single user multiple input multiple output (SU-MIMO) or multi-user MIMO (MU-MIMO) and a transmitter configured to transmit a signal based on the generated frame to the second apparatus.

Certain aspects of the present disclosure provide a method for wireless communications. The method generally includes generating, at a first apparatus, a frame comprising information relating to a SNR if a second apparatus is communicating with the first apparatus using SU-MIMO or MU-MIMO and transmitting a signal based on the generated frame to the second apparatus.

Certain aspects of the present disclosure provide a first apparatus for wireless communications. The first apparatus generally includes means for generating a frame comprising information relating to a SNR if a second apparatus is communicating with the first apparatus using SU-MIMO or MU-MIMO and means for transmitting a signal based on the generated frame to the second apparatus.

Certain aspects of the present disclosure provide a computer-program product for wireless communications. The computer-program product generally includes a computer-readable medium having instructions executable to generate, at a first apparatus, a frame comprising information relating to a SNR if a second apparatus is communicating with the first apparatus using SU-MIMO or MU-MIMO and to transmit a signal based on the generated frame to the second apparatus.

Certain aspects of the present disclosure provide a wireless node. The wireless node generally includes at least one antenna; a processing system configured to generate a frame comprising information relating to a SNR if an apparatus is communicating with the wireless node using SU-MIMO or MU-MIMO; and a transmitter configured to transmit, via the at least one antenna, a signal based on the generated frame to the apparatus.

Certain aspects of the present disclosure provide a method for wireless communications. The method generally includes generating, at an apparatus, a structure comprising channel state information (CSI), wherein the CSI includes one of a first matrix with estimates of a channel associated with the apparatus or a second matrix obtained based on singular value decomposition (SVD) of the first matrix and wherein the structure further comprises an indication of which of the first and second matrices is included in the CSI; and transmitting the structure over the channel.

Certain aspects of the present disclosure provide an apparatus for wireless communications. The apparatus generally includes a processing system configured to generate a structure comprising CSI, wherein the CSI includes one of a first matrix with estimates of a channel associated with the apparatus or a second matrix obtained based on SVD of the first matrix and wherein the structure further comprises an indication of which of the first and second matrices is included in the CSI; and a transmitter configured to transmit the structure over the channel.

Certain aspects of the present disclosure provide an apparatus for wireless communications. The apparatus generally includes means for generating a structure comprising CSI, wherein the CSI includes one of a first matrix with estimates of a channel associated with the apparatus or a second matrix obtained based on SVD of the first matrix and wherein the structure further comprises an indication of which of the first and second matrices is included in the CSI; and means for transmitting the structure over the channel.

Certain aspects provide a computer-program product for wireless communications. The computer-program product generally includes a computer-readable medium having instructions executable to generate, at an apparatus, a structure comprising CSI, wherein the CSI includes one of a first matrix with estimates of a channel associated with the apparatus or a second matrix obtained based on SVD of the first matrix and wherein the structure further comprises an indication of which of the first and second matrices is included in the CSI; and to transmit the structure over the channel.

Certain aspects provide an access terminal. The access terminal generally includes at least one antenna, a processing system configured to generate a structure comprising CSI, wherein the CSI includes one of a first matrix with estimates of a channel associated with the access terminal or a second matrix obtained based on SVD of the first matrix and wherein the structure further comprises an indication of which of the first and second matrices is included in the CSI; and a transmitter configured to transmit, via the at least one antenna, the structure over the channel.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 4 illustrates an example Channel State Information (CSI) feedback frame format in accordance with certain aspects of the present disclosure.

FIG. 5 illustrates an example Very High Throughput (VHT) Multiple Input Multiple Output (MIMO) Control field of the CSI feedback frame format of FIG. 4, in accordance with certain aspects of the present disclosure.

FIG. 8 illustrates an example VHT MIMO control field of the CSI feedback frame format of FIG. 6, in accordance with certain aspects of the present disclosure.

FIG. 9A illustrates an example table of parameters indicated by the codebook information field of the VHT MIMO control field of FIG. 8, where both the tone grouping and the number of bits for delta SNR may change, in accordance with certain aspects of the present disclosure.

FIG. 9B illustrates an example table of parameters indicated by the codebook information field of the VHT MIMO control field of FIG. 8, where the tone grouping may change, in accordance with certain aspects of the present disclosure.

FIG. 11 illustrates an example unified CSI feedback frame format in accordance with certain aspects of the present disclosure.

FIG. 12A illustrates an example table of bit resolution for each of the Given's rotation angles indicated by the codebook information field of the VHT MIMO control field of FIG. 11, where the feedback type is V-based CSI feedback, in accordance with certain aspects of the present disclosure.

FIG. 12B illustrates an example table of bit resolution for both I and Q indicated by the codebook information field of the VHT MIMO control field of FIG. 11, where the feedback type is H-based CSI feedback, in accordance with certain aspects of the present disclosure.

DETAILED DESCRIPTION

Figure 1:
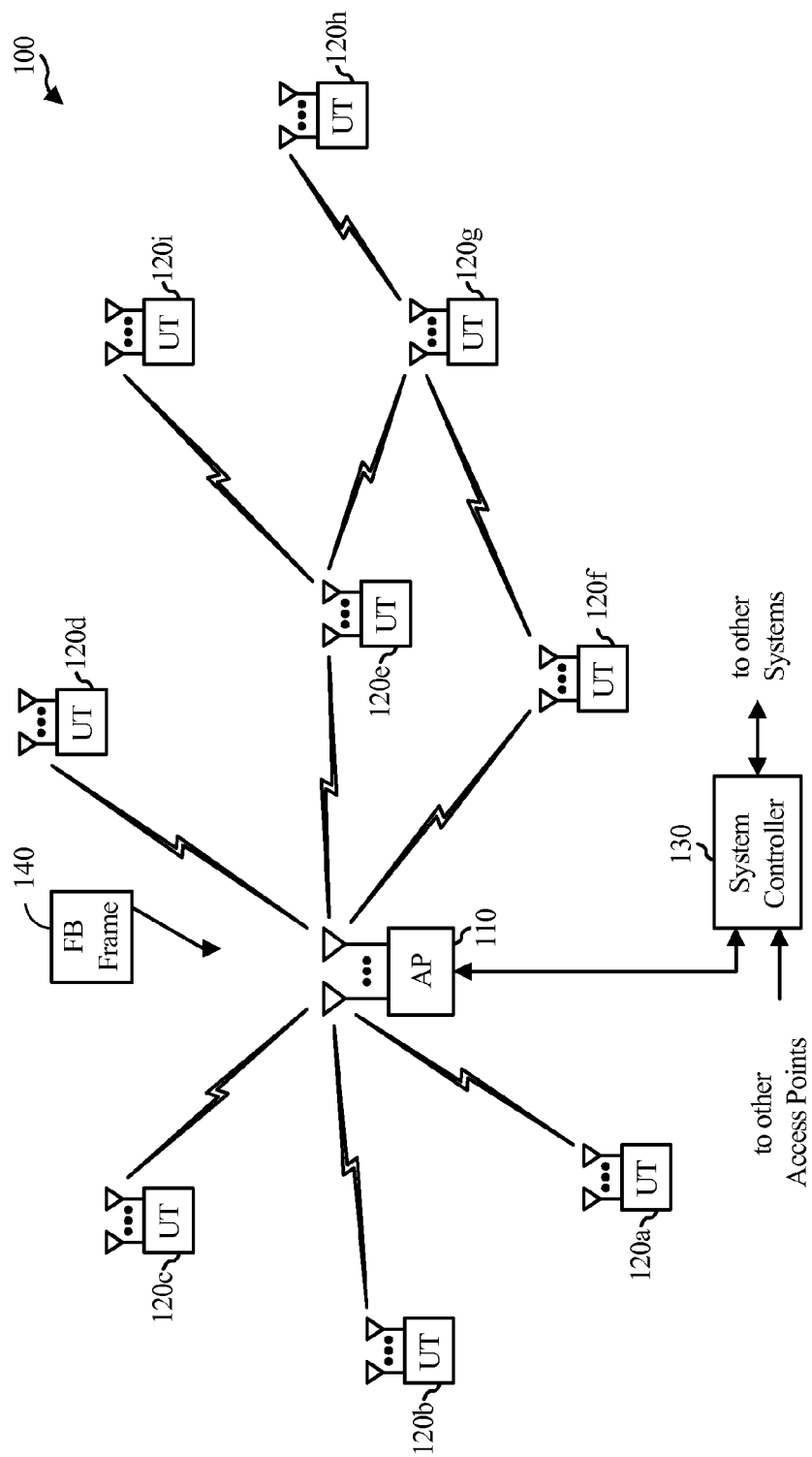
FIG. 1 illustrates a diagram of a wireless communications network in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to a different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such a wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas. For certain aspects of the present disclosure, a user terminal (e.g., user terminal 120d) may generate a feedback (FB) frame 140 and transmit a signal based on the generated FB frame 140 to the AP 110.

The SDMA system may be a time division duplex (TDD) system or a frequency division duplex (FDD) system. For a TDD system, the downlink and uplink share the same frequency band. For an FDD system, the downlink and uplink use different frequency bands. The MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
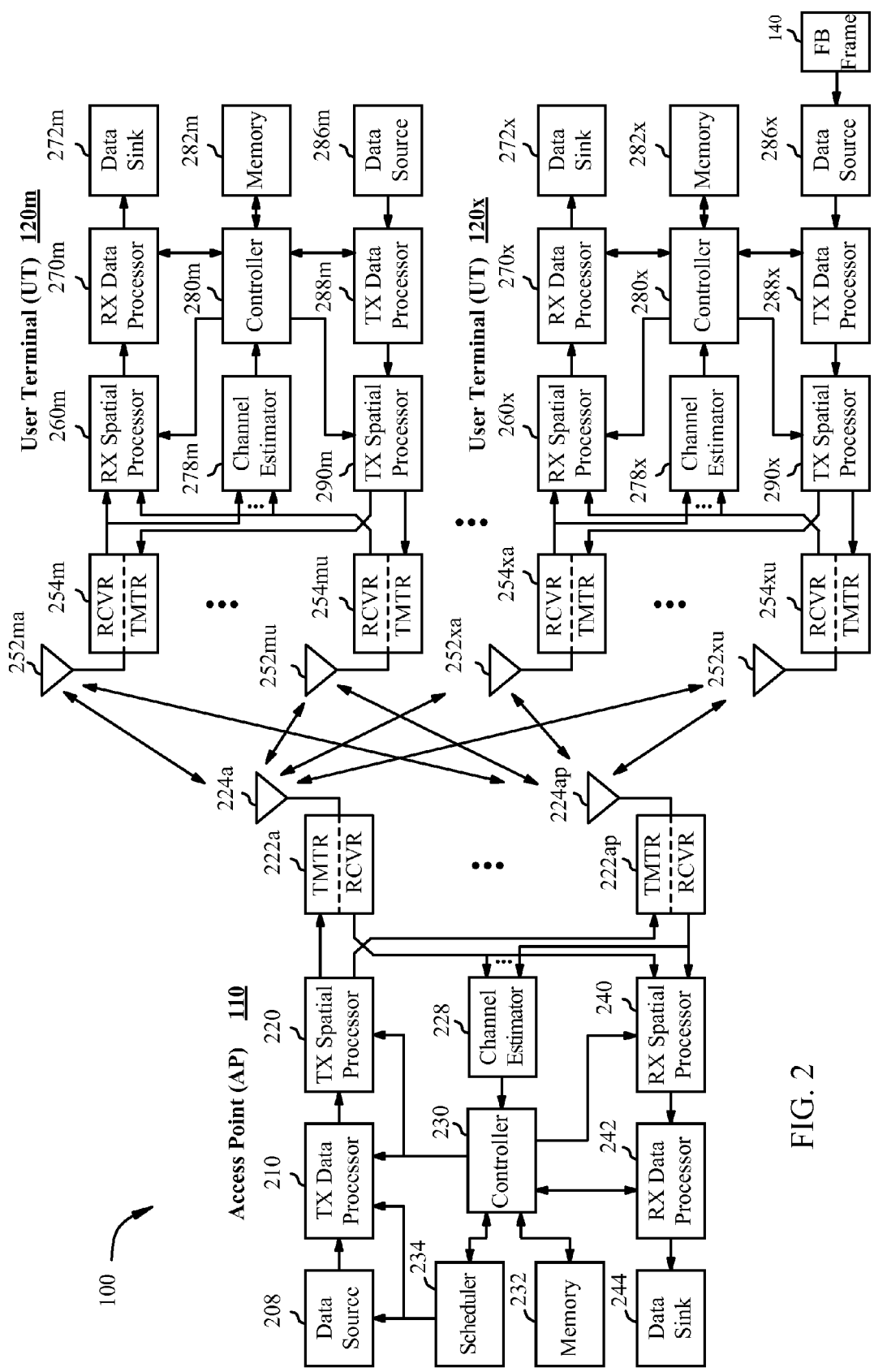
FIG. 2 illustrates a block diagram of an example access point and user terminals in accordance with certain aspects of the present disclosure.

FIG. 2 illustrates a block diagram of access point 110 and two user terminals 120m and 120x in the MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. For certain aspects, the FB frame 140 may be generated based on the traffic data from the data source 286. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
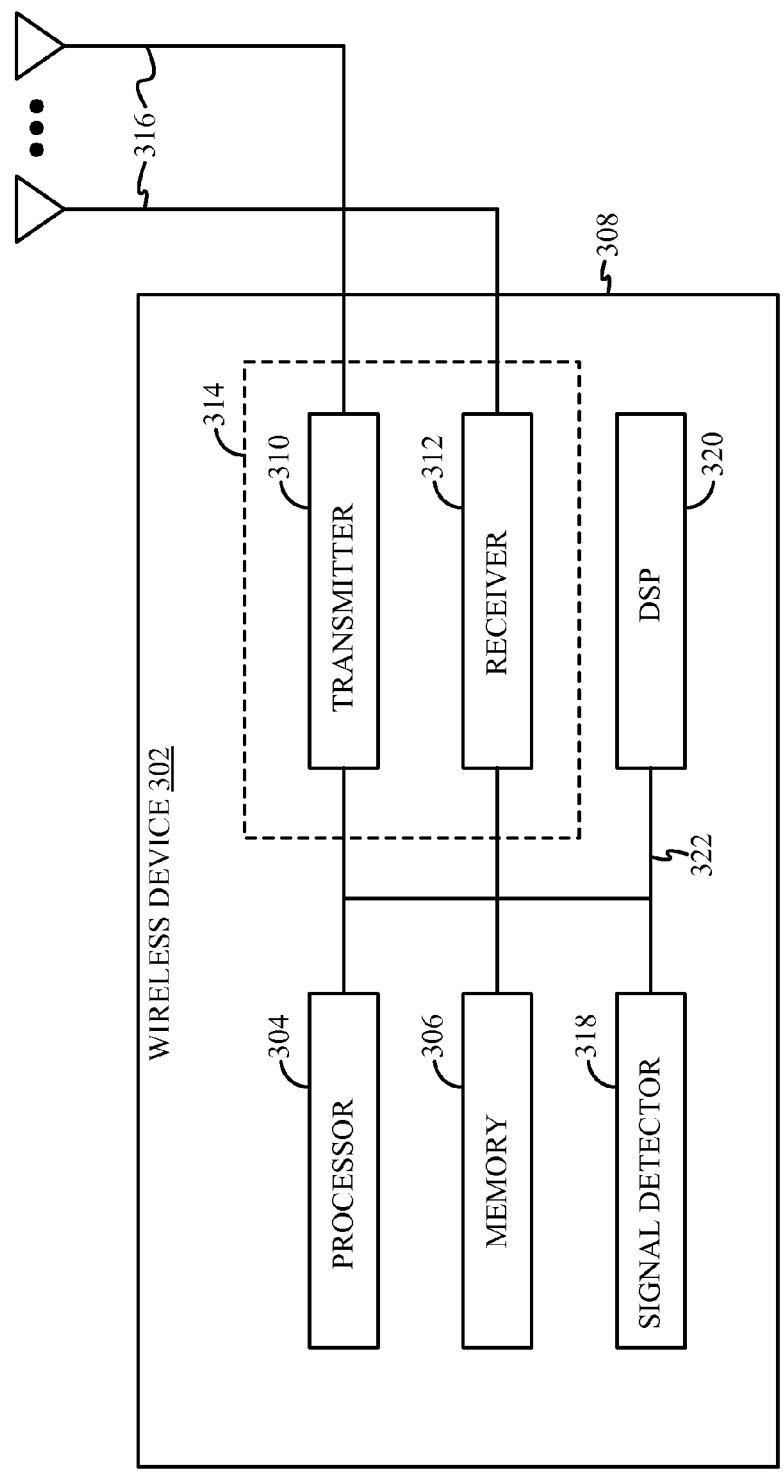
FIG. 3 illustrates a block diagram of an example wireless device in accordance with certain aspects of the present disclosure.

FIG. 3 illustrates various components that may be utilized in a wireless device 302 that may be employed within a wireless communication system, such as the MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

The system 100 illustrated in FIG. 1 may operate in accordance with the IEEE 802.11ac wireless communications standard. The IEEE 802.11ac represents an IEEE 802.11 amendment that allows for higher throughput in IEEE 802.11 wireless networks. The higher throughput may be realized through several measures, such as parallel transmissions to multiple stations (STAs) at once, or by using a wider channel bandwidth (e.g., 80 MHz or 160 MHz). The IEEE 802.11ac standard is also referred to as the Very High Throughput (VHT) wireless communications standard.

An Example CSI Feedback Frame Format

FIG. 4 illustrates an example CSI feedback frame format 400 in accordance with certain aspects of the present disclosure. For example, the frame format 400 may be a frame format for a VHT Compressed Beamforming frame. The frame format 400 may comprise a category field 402 (e.g., having a value indicating "VHT," i.e., that this frame is a VHT frame), an action field 404 (e.g., having a value indicating "compressed beamforming," i.e., that this VHT frame is a VHT Compressed Beamforming frame), a VHT MIMO control field 406, a compressed beamforming report field 408, and a multi-user (MU) exclusive beamforming report field 410. The frame format 400 may be used for both single user (SU) feedback and MU feedback. The MU exclusive beamforming report field 410 may comprise a per-tone per-SS (spatial stream) SINR (signal-to-interference-plus-noise ratio) (e.g., delta SNR; Nb=4 bits; [−8:1:7] dB; and Ng'=Ng or 4).

FIG. 5 illustrates an example VHT MIMO control field 406 in accordance with certain aspects of the present disclosure. For certain aspects, the VHT MIMO control field 406 may comprise up to 3 octets (24 bits). Bits 502 (e.g., three bits) may indicate the number of columns (Nc) in a compressed beamforming matrix V, and bits 504 (e.g., three bits) may indicate the number of rows (Nr) in matrix V. Bits 506 (e.g., two bits) may indicate a bandwidth (BW) (e.g., the width of a channel in which the measurement to create matrix V was created). For example, a value of 0 may indicate a channel width of 20 MHz, a value of 1 may indicate a channel width of 40 MHz, a value of 2 may indicate a channel width of 80 MHz, and a value of 3 may indicate a channel width of 160 MHz. Bits 508 (e.g., two bits) may comprise a number of groups parameter (Ng) for tone grouping (an indication about sampling of the CSI feedback), wherein a value of 0 may indicate that Ng=1, a value of 1 may indicate that Ng=2, and a value of 2 may indicate that Ng=4. A value of 3 may be reserved, at least for the time being.

Bit 510 may comprise codebook information, such as a bit resolution for each of the Given's rotation angles ψ and φ (nomenclature of these angles is the same as that in the IEEE 802.11n amendment to the IEEE 802.11 standard). For certain aspects involving SU mode, for example, when the MU-type bit 512 is not set (i.e., has a value of 0), a value of 0 for the codebook information bit 510 may indicate two bits of resolution for ψ (i.e., two bits are used to quantize ψ) and four bits of resolution for φ (i.e., four bits are used to quantize φ), and a value of 1 for codebook information bit 510 may indicate four bits of resolution for ψ and six bits of resolution for φ. For other aspects involving MU mode, for example, when the MU-type bit 512 is set (i.e., has a value of 1), a value of 0 for bit 510 may indicate five bits of resolution for ψ and seven bits of resolution for φ, and a value of 1 for bit 510 may indicate seven bits of resolution for ψ and nine bits of resolution for φ. Bits 514 may comprise a sounding sequence number (i.e., a sequence number from a null data packet announcement (NDPA) soliciting feedback).

However, the frame format 400 may create avenues for the state machines to diverge substantially between SU feedback and MU feedback. For example, an access point 110 may extract sub-band SNR using VHT-control for SU feedback, but using per-tone SNR in MU feedback. IEEE 802.11ac may introduce additional fields to the MU-exclusive beamforming report 410 (e.g., H feedback). These developments may hurt adoption of MU-MIMO.

To mitigate these, the CSI feedback frame format may be unified between SU and MU modes by removing the SU/MU CSI frame format differentiation and signaling. In other words, the CSI feedback frame will not comprise a designation differentiating between different formats of the frame based on SU-MIMO versus MU-MIMO.

Figure 6:
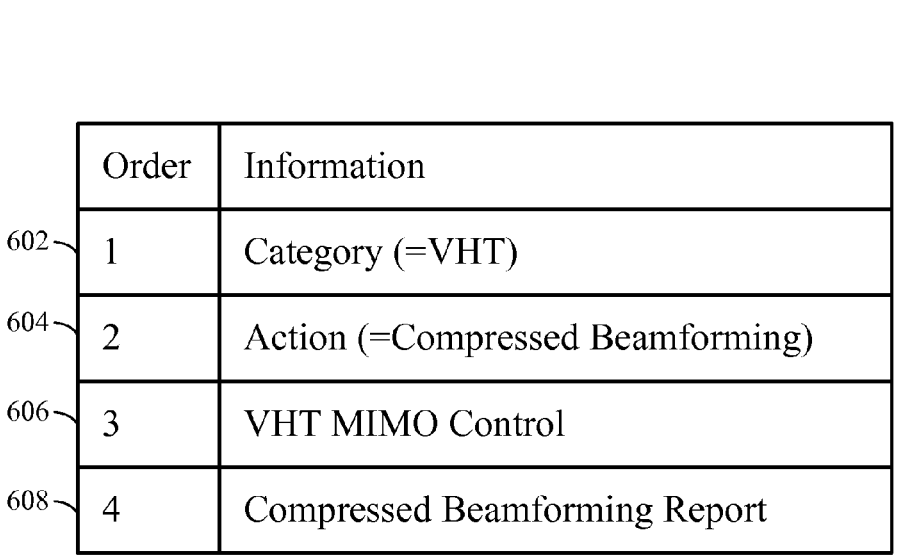
FIG. 6 illustrates an example unified CSI feedback frame format in accordance with certain aspects of the present disclosure.

FIG. 6 illustrates an example of a unified CSI feedback frame format 600 in accordance with certain aspects of the present disclosure. A "Delta SNR" field may be added for all users, but the Delta SNR overhead may be less than 5% for Given's rotation angles' bit resolutions (bψ, bφ)=(2, 4) and (4, 6). For each subcarrier k and column i of beamforming matrix V, the Delta SNR ($\Delta SNR_{k,i}$) may be computed as the difference in decibels (dB) of the SNR of that subcarrier for that column relative to the average SNR of the corresponding space-time stream. In other words, Delta SNR may be expressed by the following equation:

$$\Delta SNR_{k,i} = 10\log_{10}\left(\frac{\|H_k V_{k,i}\|^2}{N}\right) - \overline{SNR_i}$$

where $H_k$ is the estimated MIMO channel for subcarrier k, $V_{k,i}$ is column i of the beamforming matrix V for subcarrier k, $\overline{SNR_i}$ is the average SNR of space-time stream i reported in the compressed beamforming report field, and N is the average noise-plus-interference power measured at the beamformee that was used to calculate $\overline{SNR_i}$. Delta SNR may be quantized to 2 or 4 bits, for example, and may range from −8 dB to 7 dB with 1 dB granularity ([−8:1:7] dB). Clients may be allowed to set Delta SNR to 0 dB for (bψ, bφ)=(2, 4) and (4, 6).

The MU-exclusive beamforming report field 410 (illustrated in FIG. 4) may be removed from the frame format 600. The frame format 600 may comprise a category field 602 (e.g., having a value indicating "VHT," i.e., that this frame is a VHT frame), an action field 604 (e.g., having a value indicating "compressed beamforming," i.e., that this VHT frame is a VHT Compressed Beamforming frame), a VHT MIMO control field 606, and a compressed beamforming report field 608. In this manner, there is no separate set of MU-MIMO fields at the end of the CSI feedback frame. For certain aspects, the contents of the MU-exclusive beamforming report field 410 may be integrated within the compressed beamforming report field 608.

Figure 7:
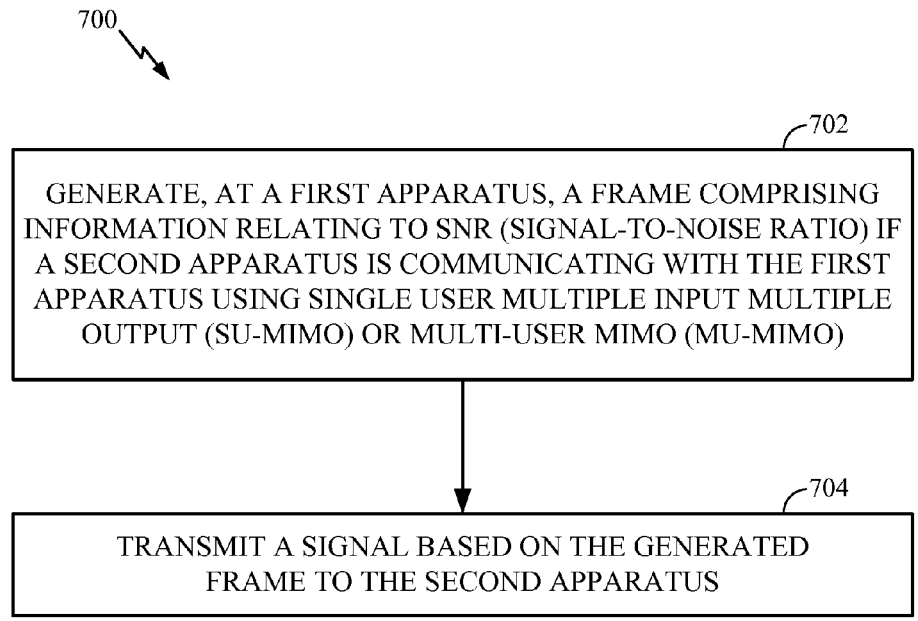
FIG. 7 illustrates example operations to generate a unified frame format of CSI feedback for VHT wireless systems, in accordance with certain aspects of the present disclosure.

FIG. 7 illustrates example operations 700 for constructing the unified CSI feedback frame and transmitting the CSI feedback in accordance with certain aspects of the present disclosure. The operations 700 may be performed at a user terminal 120, for example. The operations may begin at 702 by generating at a first apparatus (e.g., the user terminal), a frame comprising information relating to SNR if a second apparatus (e.g., an access point 110) is communicating with the user terminal using single user Multiple Input Multiple Output (SU-MIMO) or multi-user MIMO (MU-MIMO). In other words, the user terminal may generate a frame indicating the Delta SNR in either MIMO case. For certain aspects, the frame does not comprise a designation (e.g., a MU-type bit 512 or a MU-exclusive beamforming report field 410) differentiating between different formats of the frame based on SU-MIMO versus MU-MIMO. At 704, the first apparatus may transmit a signal based on the generated frame to the second apparatus.

FIG. 8 illustrates an example VHT MIMO control field 606 in accordance with certain aspects of the present disclosure. Bits 810 (e.g., increased to two bits) may comprise codebook information indicating a bit resolution for each of the Given's rotations angles $\psi$ and $\phi$, a number of bits for expressing the value of the Delta SNR information (DeltaSNR_Nb, or just Nb), the Delta SNR information using the number of indicated bits, and/or a modified number of groups parameter (Ng') for tone grouping.

For certain aspects as illustrated in table 900 of FIG. 9A, in an effort to remove SU/MU CSI frame format differentiation and signaling, both Nb and Ng' may be varied depending on the value of the codebook information bits 810. For example, a value of 0 for the codebook information bits 810 may indicate two bits of resolution for $\psi$ (i.e., two bits are used to quantize $\psi$) and four bits of resolution for $\phi$ (i.e., four bits are used to quantize $\phi$), two bits for Nb (i.e., two bits are used to express the value of Delta SNR), and Ng' equal to the product of Ng and four (Ng'=4*Ng). A value of 1 for the codebook information bits 810 may indicate four bits of resolution for $\psi$ and six bits of resolution for $\phi$, two bits for Nb, and Ng' equal to the product of Ng and four. A value of 2 for the codebook information bits 810 may indicate five bits of resolution for $\psi$ and seven bits of resolution for $\phi$, four bits for Nb, and Ng' equal to the product of Ng and two. A value of 3 for the codebook information bits 810 may indicate seven bits of resolution for $\psi$ and nine bits of resolution for $\phi$, four bits for Nb, and Ng' equal to the product of Ng and two.

For other aspects as illustrated in table 950 of FIG. 9B, in an effort to remove SU/MU CSI frame format differentiation and signaling, only Ng' may be varied depending on the value of the codebook information bits 810. For example, a value of 0 for the codebook information bits 810 may indicate two bits of resolution for $\psi$ (i.e., two bits are used to quantize $\psi$) and four bits of resolution for $\phi$ (i.e., four bits are used to quantize $\phi$), four bits for Nb (i.e., four bits are used to express the value of Delta SNR), and Ng' equal to the product of Ng and eight (Ng'=8*Ng). A value of 1 for the codebook information bits 810 may indicate four bits of resolution for $\psi$ and six bits of resolution for $\phi$, four bits for Nb, and Ng' equal to the product of Ng and eight. A value of 2 for the codebook information bits 810 may indicate six bits of resolution for $\psi$ and eight bits of resolution for $\phi$, four bits for Nb, and Ng' equal to the product of Ng and two. A value of 3 for the codebook information bits 810 may indicate seven bits of resolution for $\psi$ and nine bits of resolution for $\phi$, four bits for Nb, and Ng' equal to the product of Ng and two.

Another Example CSI Feedback Frame Format

Certain aspects of the present disclosure support constructing a unified channel state information (CSI) feedback format for IEEE 802.11ac (the Very High Throughput (VHT)) wireless communications standard. This structure may work efficiently for both single user (SU) and multi user (MU) feedback.

In an aspect, the CSI feedback may comprise one or more columns of a beamforming matrix V, wherein the matrix V may be obtained using a singular value decomposition (SVD) of a wireless channel matrix H. For example, the matrix V may comprise a matrix of right eigenvectors of the wireless channel. Alternatively, the matrix V may comprise a matrix of left eigenvectors of the wireless channel. In another aspect, the CSI feedback may comprise one or more columns of the matrix V and one or more columns of a matrix S, wherein the matrix S may be obtained using the SVD of the channel matrix H. For example, the matrix S may comprise a matrix of eigenvalues of the wireless channel. In yet another aspect, the CSI feedback may comprise one or more columns of the matrix H.

In an aspect, the CSI feedback based on the matrix V may be utilized in the case of SU transmit beamforming. In the case of MU-MIMO transmission, the CSI feedback based on the matrix H may perform better than the CSI feedback based on both the matrix S and the matrix V. It is shown in the present disclosure that the CSI feedback based on the H matrix may perform better than the CSI feedback comprising the matrix V for transmit beamforming (TxBF), for a number of transmit spatial streams (Nss) greater than one and equal modulation and coding scheme (MCS) restrictions.

It would be beneficial for simplifying implementation to avoid an access point (AP) having to collect different types of feedback for SU and MU transmission modes. This approach may simplify CSI feedback collection and processing at the AP. This approach may also allow the AP to make on-the-fly decisions whether to utilize transmit beamforming or MU-MIMO transmission based on traffic and re-transmissions.

Figure 10:
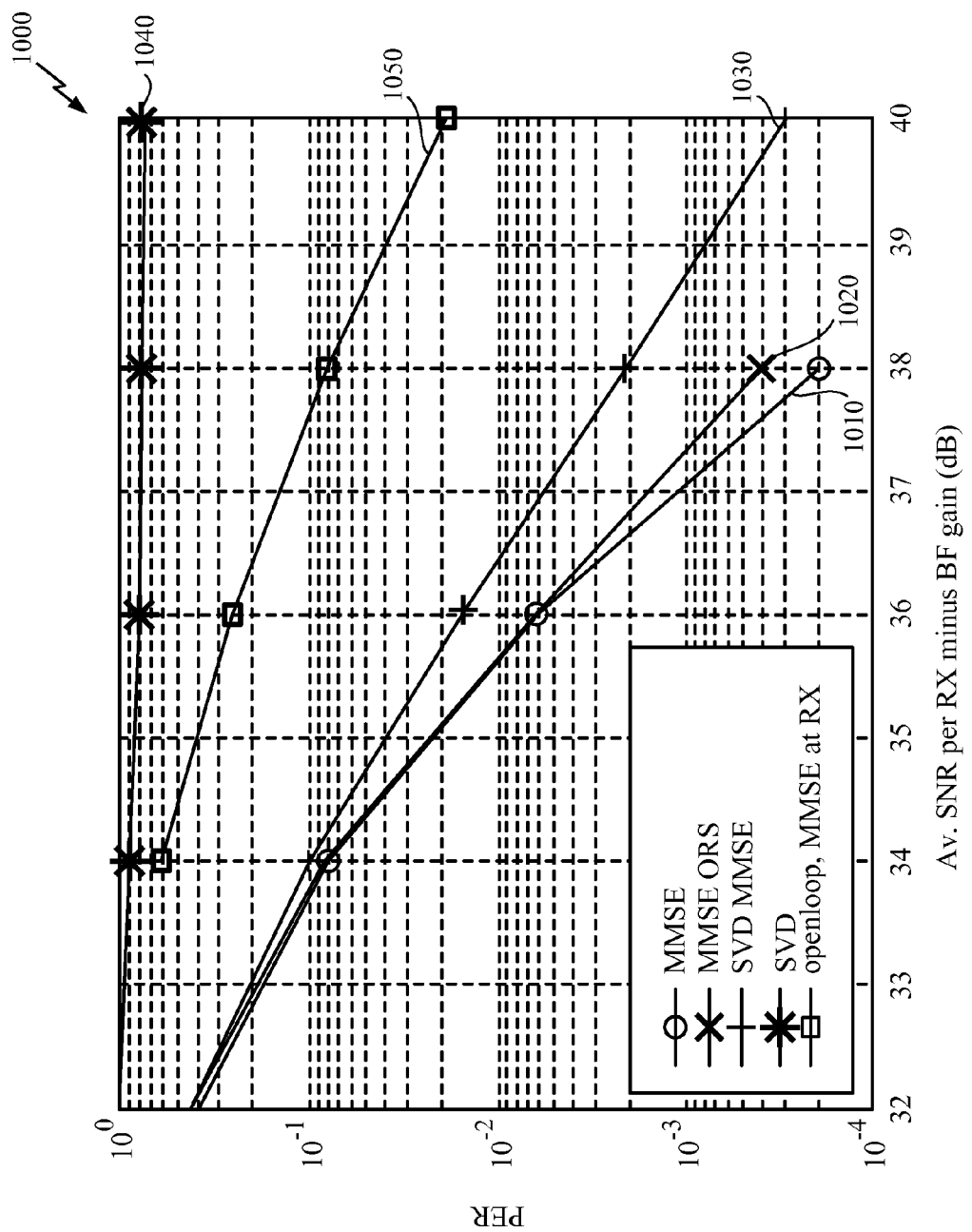
FIG. 10 illustrates example performance results for different CSI feedback types in accordance with certain aspects of the present disclosure.

FIG. 10 illustrates a graph 1000 of example performance results for different CSI feedback types in accordance with certain aspects of the present disclosure. The results were generated using four transmit antennas at an AP and four receive antennas at one or more user stations (STAs), 64-QAM modulation, and a coding rate of 5/6.

It may be observed from FIG. 10 that utilizing CSI feedback with the matrix V (i.e., plots 1030 and 1040) may result in considerable flooring. On the other hand, utilizing CSI feedback with the matrix H along with minimum mean square error (MMSE) precoding at the AP side (i.e., plots 1010 and 1020) may provide preferred error rate performance.

Example CSI Feedback Rules

The choice of utilizing either V-based CSI feedback, or H-based CSI feedback, as well as of choosing a tone grouping parameter Ng and codebook parameters may represent a purely client side implementation issue (performance/power/overhead). It should be noted that the matrix V may be generated from the matrix H, so feeding back the matrix H may be trivial. It may also be desirable to have no SU/MU differentiation.

CSI feedback with matrix V or with matrix H may offer several different example scenarios. For example, SU-capable STAs with many receive antennas may transmit the CSI feedback with matrix V to save transmission overhead and power. SU-capable STAs with Nss>1 may transmit the CSI feedback with matrix H in order to achieve preferred performance. It can be observed from FIG. 10 that V-based CSI feedback with equal MCS restriction may actually negatively affect the packet error rate (PER) performance. MU-capable STAs may transmit H-based CSI feedback in order to obtain preferred performance. SU-capable STAs may transmit V(2, 4) feedback at low SNRs and Nss=1, but may transmit H-based CSI feedback at high SNRs.

An AP may be designed to process both matrix H and matrix V. However, the complexity increase with this design may be negligible. For MU-MIMO transmissions, AP precoder computations (e.g., by MMSE/ZF (Zero Forcing) precoders) may be identical whether CSI feedback per user was H-based or V-based. The AP may most likely perform the additional step of decompressing matrix V, in the case of V-based CSI feedback.

For SU transmit beamforming with Nss>1 and equal MCS restriction, the AP need not perform SVD either for H-based or V-based CSI feedback. It can be observed from FIG. 10 that the MMSE precoder may perform better than SVD.

For SU transmit beamforming, even if the AP perform SVD to generate V matrix from the H-based CSI feedback, the complexity may be reasonable. If a battery-operated handset can generate matrix V from matrix H, then so can a wall-mounted AP. A STA that can generate V-based CSI feedback may also re-use hardware to generate matrix V for a precoder. In an aspect, the AP may utilize feedback for either SU or MU transmissions.

By applying the CSI feedback structure described herein, a Null Data Packet Announcement (NDPA) need not dictate feedback parameters such as V versus H, Ng and codebook parameters. Further, capability exchange need not indicate support for CSI feedback parameters such as V/H-based CSI feedback, different Ng, and different codebooks.

An Example CSI Feedback Format

FIG. 11 illustrates an example unified CSI feedback frame format 1100 in accordance with certain aspects of the present disclosure. This structure may represent a VHT MIMO control field for CSI feedback.

Bits 1102 (e.g., three bits) may indicate the number of columns (Nc) of matrices V or H, and bits 1104 (e.g., three bits) may indicate the number of rows (Nr) of matrices V or H. Bits 1106 (e.g., two bits) may indicate a bandwidth (BW) (e.g., the width of a channel in which the measurement to create matrix V or H was created). For example, a value of 0 may indicate a channel width of 20 MHz, a value of 1 may indicate a channel width of 40 MHz, a value of 2 may indicate a channel width of 80 MHz, and a value of 3 may indicate a channel width of 160 MHz. Bits 1108 (e.g., two bits) may comprise a number of groups parameter (Ng) for tone grouping (an indication about sampling of the CSI feedback), wherein a value of 1 may indicate that Ng=2, a value of 2 may indicate that Ng=3, and a value of 3 may indicate that Ng=4.

Bits 1110 (e.g., two bits) may comprise codebook information, such as a bit resolution for each of the Given's rotation angles ψ and φ (nomenclature of these angles is the same as that in the IEEE 802.11n amendment to the IEEE 802.11 standard). For certain aspects as illustrated in table 1200 in FIG. 12A, in the case of V-based CSI feedback, a value of 0 for bits 1110 may indicate 2 bits of resolution for ψ (i.e., 2 bits are used to quantize ψ) and 4 bits of resolution for φ (i.e., 4 bits are used to quantize φ), a value of 1 for bits 1110 may indicate 4 bits of resolution for ψ and 6 bits of resolution for φ, a value of 2 for bits 1110 may indicate 5 bits of resolution for ψ and 7 bits of resolution for φ, and a value of 3 for bits 1110 may indicate 7 bits of resolution for ψ and 9 bits of resolution for φ.

For other aspects as illustrated in table 1250 in FIG. 12B, in the case of H-based CSI feedback, the same bit-width resolution may be used for I and Q values of the H-based CSI feedback. For example, a value of zero for bits 1110 may indicate 4 bits of resolution, a value of one for bits 1110 may indicate 6 bits of resolution, and a value of two for bits 1110 may indicate 8 bits of resolution for the H-based CSI feedback.

A feedback-type bit 1112 may be used to differentiate between H-based CSI feedback and V-based CSI feedback. For example, a value of zero may indicate V-based CSI feedback, while a value of one may indicate H-based CSI feedback, or vice versa. Bits 1114 may comprise a sounding sequence number (i.e., a sequence number from a null data packet announcement (NDPA) soliciting feedback).

H-based CSI feedback may provide better performance than the CSI feedback comprising both the S matrix and V matrix. Even if the AP and client have implemented V-based CSI feedback for transmit beamforming, the extra complexity involved to support CSI feedback with V and S matrices may be more than for H-based CSI feedback. Every Ng tones, the AP may uncompress matrix V and matrix multiply V with S, prior to precoder calculation, and the client may compute the matrix S. According to certain aspects of the present disclosure, extra computations need not be performed for H-based CSI feedback, since the channel matrix H may be already available at the client at zero cost.

Figure 13:
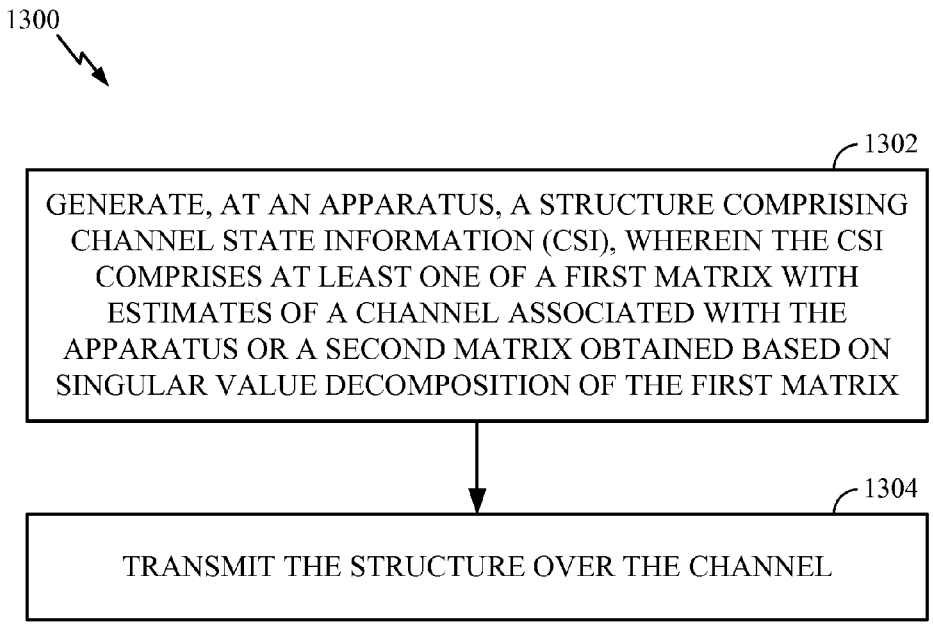
FIG. 13 illustrates example operations for constructing a unified CSI feedback frame and transmitting the CSI feedback frame in accordance with certain aspects of the present disclosure.
Figure 13A:
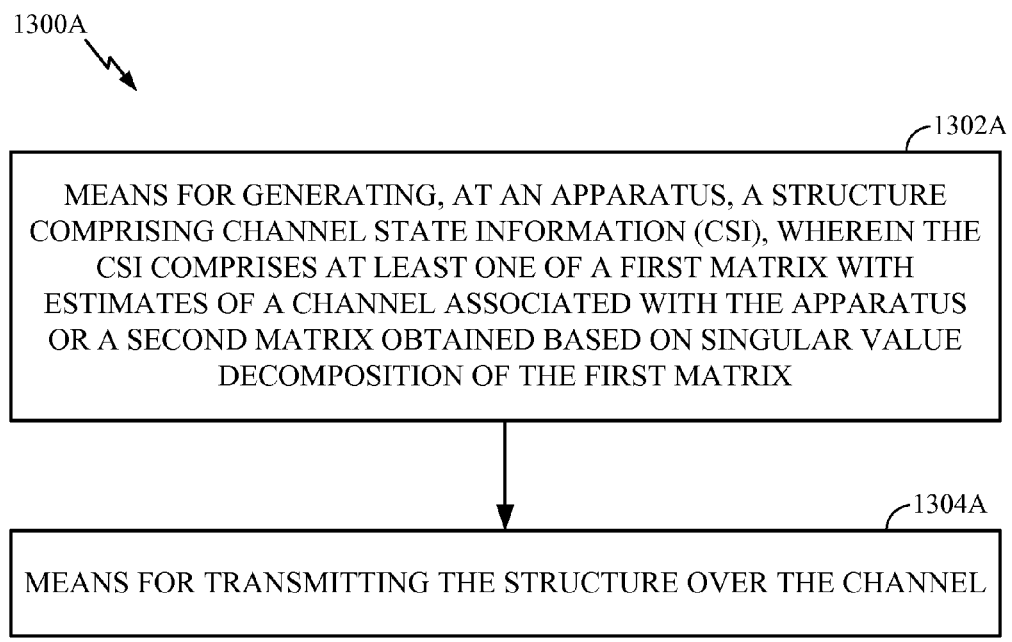
FIG. 13A illustrates example means capable of performing the operations of FIG. 13.

FIG. 13 illustrates example operations 1300 for constructing a unified structure (e.g., a frame) for CSI feedback and transmitting the CSI feedback structure in accordance with certain aspects of the present disclosure. In an aspect, the operations 1300 may be performed by an apparatus, such as a user terminal 120. The operations 1300 may begin, at 1302, by generating a structure comprising channel state information (CSI), wherein the CSI may comprise at least one of a first matrix with estimates of a channel associated with the apparatus or a second matrix obtained based on singular value decomposition (SVD) of the first matrix. The structure may further include an indication of which of the first and second matrices is included in the CSI. At 1304, the apparatus may transmit the structure over the channel.

For certain aspects, the indication of which of the first and second matrices is included in the CSI may comprise a first type indicating a beamforming matrix V (if the CSI includes the first matrix) or a second type indicating a channel matrix H (if the CSI includes the second matrix). The structure may further comprise at least one of: numbers of columns or rows of at least one of the first matrix or the second matrix, a bandwidth associated with the channel, an indication about sampling of the CSI (e.g., Ng), or an indication about a number of bits used for representing the CSI. The structure may comprise a VHT MIMO Control field, wherein the indication (of which of the first and second matrices is included in the CSI) is expressed as a sub-field (e.g., the Feedback Type sub-field expressed by the feedback-type bit 1112) within the VHT MIMO Control field.

The operations 1300 may further comprise determining at least one of the first matrix, the second matrix, or one or more parameters for inclusion in the unified structure. The one or more parameters may include at least one of an indication about sampling of the CSI or an indication about a number of bits used for representing the CSI.

Figure 7A:
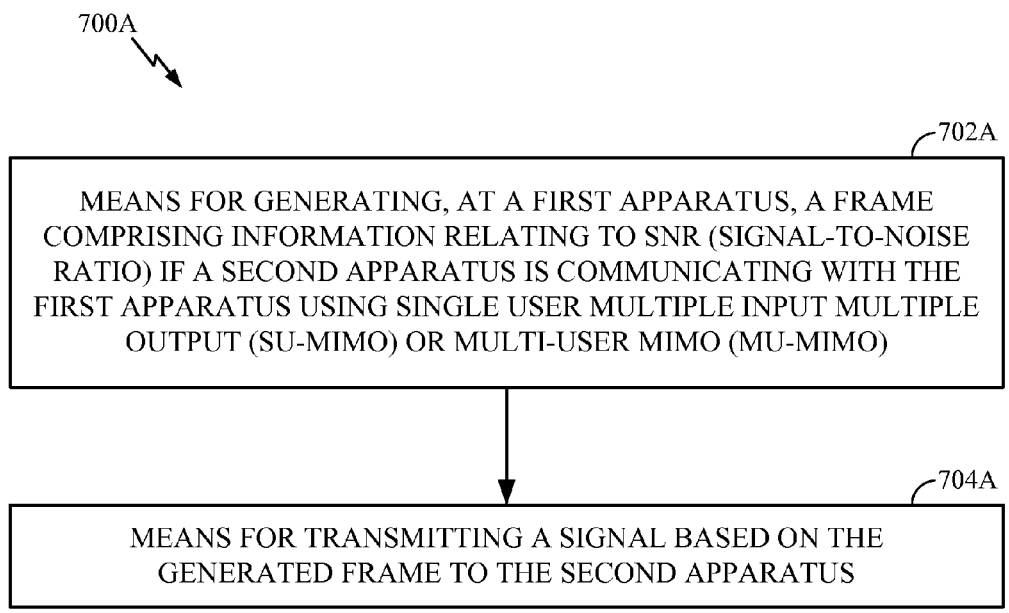
FIG. 7A illustrates example means capable of performing the operations shown in FIG. 7.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 700 illustrated in FIG. 7 correspond to means 700A illustrated in FIG. 7A.

For example, means for transmitting may comprise a transmitter, such as the transmitter unit 222 of the access point 110 illustrated in FIG. 2, the transmitter unit 254 of the user terminal 120 depicted in FIG. 2, or the transmitter 310 of the wireless device 302 shown in FIG. 3. Means for generating the frame or structure, means for determining, and/or means for processing may comprise a processing system—which may include one or more processors, such as the TX data processor 288 and/or the controller 280—and/or the data source 286 of the user terminal 120 illustrated in FIG. 2.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A first apparatus for wireless communications, comprising:
 a processing system configured to generate a frame comprising information relating to a signal-to-noise ratio (SNR) if a second apparatus is communicating with the first apparatus using single user multiple input multiple output (SU-MIMO) or multi-user MIMO (MU-MIMO); and
 a transmitter configured to transmit a signal based on the generated frame to the second apparatus,
 wherein the frame comprises a number of bits for expressing a value of the SNR, and wherein the value of the SNR comprises a difference in decibels (dB) between a determined SNR for a subcarrier and a column of a channel estimation matrix for a subcarrier and an average SNR of a space-time stream corresponding to the column.

2. The first apparatus of claim 1, wherein the frame comprises two bits indicating a bit resolution for each of Given's rotation angles ψ and φ.

3. The first apparatus of claim 1, wherein the number of bits for expressing the value of the SNR is 4 bits.

4. The first apparatus of claim 1, wherein the frame comprises two bits indicating a number of groups parameter (Ng') for tone grouping.

5. A method for wireless communications, comprising:
 generating, at a first apparatus, a frame comprising information relating to a signal-to-noise ratio (SNR) if a second apparatus is communicating with the first apparatus using single user multiple input multiple output (SU-MIMO) or multi-user MIMO (MU-MIMO); and
 transmitting a signal based on the generated frame to the second apparatus,
 wherein the frame comprises a number of bits for expressing a value of the SNR, and wherein the value of the SNR comprises a difference in decibels (dB) between a determined SNR for a subcarrier and a column of a channel estimation matrix for a subcarrier and an average SNR of a space-time stream corresponding to the column.

6. The method of claim 5, wherein the frame comprises two bits indicating a bit resolution for each of Given's rotation angles ψ and φ.

7. The method of claim 5, wherein the number of bits for expressing the value of the SNR is 4 bits.

8. The method of claim 5, wherein the frame comprises two bits indicating a number of groups parameter (Ng') for tone grouping.

9. A first apparatus for wireless communications, comprising:
 means for generating a frame comprising information relating to a signal-to-noise ratio (SNR) if a second apparatus is communicating with the first apparatus using single user multiple input multiple output (SU-MIMO) or multi-user MIMO (MU-MIMO); and means for transmitting a signal based on the generated frame to the second apparatus, wherein the frame comprises a number of bits for expressing a value of the SNR, and wherein the value of the SNR comprises a difference in decibels (dB) between a determined SNR for a subcarrier and a column of a channel estimation matrix for a subcarrier and an average SNR of a space-time stream corresponding to the column.

10. The first apparatus of claim 9, wherein the frame comprises two bits indicating a bit resolution for each of Given's rotation angles $\psi$ and $\phi$.

11. The first apparatus of claim 9, wherein the number of bits for expressing the value of the SNR is 4 bits.

12. The first apparatus of claim 9, wherein the frame comprises two bits indicating a number of groups parameter (Ng') for tone grouping.

13. A computer-program product for wireless communications, comprising a computer-readable medium comprising instructions executable to:

generate, at a first apparatus, a frame comprising information relating to a signal-to-noise ratio (SNR) if a second apparatus is communicating with the first apparatus using single user multiple input multiple output (SU-MIMO) or multi-user MIMO (MU-MIMO); and transmit a signal based on the generated frame to the second apparatus, wherein the frame comprises a number of bits for expressing a value of the SNR and wherein the value of the SNR comprises a difference in decibels (dB) between a determined SNR for a subcarrier and a column of a channel estimation matrix for a subcarrier and an average SNR of a space-time stream corresponding to the column.

14. A wireless node, comprising:

at least one antenna;

a processing system configured to generate a frame comprising information relating to a signal-to-noise ratio (SNR) if an apparatus is communicating with the wireless node using single user multiple input multiple output (SU-MIMO) or multi-user MIMO (MU-MIMO); and a transmitter configured to transmit, via the at least one antenna, a signal based on the generated frame to the apparatus;

wherein the frame comprises a number of bits for expressing a value of the SNR, and wherein the value of the SNR comprises a difference in decibels (dB) between a determined SNR for a subcarrier and a column of a channel estimation matrix for a subcarrier and an average SNR of a space-time stream corresponding to the column.

15. An apparatus for wireless communications, comprising:

a processing system configured to generate a structure comprising channel state information (CSI), wherein the CSI includes one of a first matrix with estimates of a channel associated with the apparatus or a second matrix obtained based on singular value decomposition (SVD) of the first matrix, wherein the structure comprises an indication of whether the CSI can be used for multiple user MIMO or single user MIMO; and a transmitter configured to transmit the structure over the channel.

16. The apparatus of claim 15, wherein the structure further comprises at least one of: a number of columns or rows of the first matrix or the second matrix, a bandwidth associated with the channel, an indication about sampling of the CSI, or an indication about a number of bits used for representing the CSI.

17. The apparatus of claim 15, wherein the structure further comprises an indication of which of the first and second matrices is included in the CSI and wherein the indication of which of the first and second matrices is included in the CSI comprises:

a first type indicating a beamforming matrix V, if the CSI includes the first matrix; or a second type indicating a channel matrix H, if the CSI includes the second matrix.

18. The apparatus of claim 15, wherein the processing system is further configured to determine at least one of the first matrix, the second matrix, or one or more parameters for inclusion in the structure.

19. The apparatus of claim 18, wherein the one or more parameters comprise at least one of an indication about sampling of the CSI or an indication about a number of bits used for representing the CSI.

20. A method for wireless communications, comprising:

generating, at an apparatus, a structure comprising channel state information (CSI), wherein the CSI includes one of a first matrix with estimates of a channel associated with the apparatus or a second matrix obtained based on singular value decomposition (SVD) of the first matrix, wherein the structure comprises an indication of whether the CSI can be used for multiple user MIMO or single user MIMO; and transmitting the structure over the channel.

21. The method of claim 20, wherein the structure further comprises at least one of: a number of columns or rows of the first matrix or the second matrix, a bandwidth associated with the channel, an indication about sampling of the CSI, or an indication about a number of bits used for representing the CSI.

22. The method of claim 20, wherein the structure further comprises an indication of which of the first and second matrices is included in the CSI, wherein the indication of which of the first and second matrices is included in the CSI comprises:

a first type indicating a beamforming matrix V, if the CSI includes the first matrix; or a second type indicating a channel matrix H, if the CSI includes the second matrix.

23. The method of claim 20, further comprising:

determining at least one of the first matrix, the second matrix, or one or more parameters for inclusion in the structure.

24. The method of claim 23, wherein the one or more parameters comprise at least one of an indication about sampling of the CSI or an indication about a number of bits used for representing the CSI.

25. An apparatus for wireless communications, comprising:

means for generating a structure comprising channel state information (CSI), wherein the CSI includes one of a first matrix with estimates of a channel associated with the apparatus or a second matrix obtained based on singular value decomposition (SVD) of the first matrix, wherein the structure comprises an indication of whether the CSI can be used for multiple user MIMO or single user MIMO; and means for transmitting the structure over the channel.

26. The apparatus of claim 25, wherein the structure further comprises at least one of: a number of columns or rows of the first matrix or the second matrix, a bandwidth associated with the channel, an indication about sampling of the CSI, or an indication about a number of bits used for representing the CSI.

27. The apparatus of claim 25, wherein the structure further comprises an indication of which of the first and second matrices is included in the CSI, and wherein the indication of which of the first and second matrices is included in the CSI comprises:
- a first type indicating a beamforming matrix V, if the CSI includes the first matrix; or
- a second type indicating a channel matrix H, if the CSI includes the second matrix.

28. The apparatus of claim 25, further comprising:
- means for determining at least one of the first matrix, the second matrix, or one or more parameters for inclusion in the structure.

29. The apparatus of claim 28, wherein the one or more parameters comprise at least one of an indication about sampling of the CSI or an indication about a number of bits used for representing the CSI.

30. A computer-program product for wireless communications, comprising a computer-readable medium comprising instructions executable to:
- generate, at an apparatus, a structure comprising channel state information (CSI), wherein the CSI includes one of a first matrix with estimates of a channel associated with the apparatus or a second matrix obtained based on singular value decomposition (SVD) of the first matrix, wherein the structure comprises an indication of whether the CSI can be used for multiple user MIMO or single user MIMO; and
- transmit the structure over the channel.

31. An access terminal comprising:
- at least one antenna;
- a processing system configured to generate a structure comprising channel state information (CSI), wherein the CSI includes one of a first matrix with estimates of a channel associated with the access terminal or a second matrix obtained based on singular value decomposition (SVD) of the first matrix, wherein the structure comprises an indication of whether the CSI can be used for multiple user MIMO or single user MIMO; and
- a transmitter configured to transmit, via the at least one antenna, the structure over the channel.

32. The apparatus of claim 15, wherein the structure further comprises a Very High Throughput (VHT) multiple input multiple output (MIMO) control field.

33. The method of claim 20, wherein the structure further comprises a Very High Throughput (VHT) multiple input multiple output (MIMO) control field.

* * * * *